G. W. COPELAND.
COTTON CHOPPER.
APPLICATION FILED JUNE 23, 1911.
1,083,806.
Patented Jan. 6, 1914.
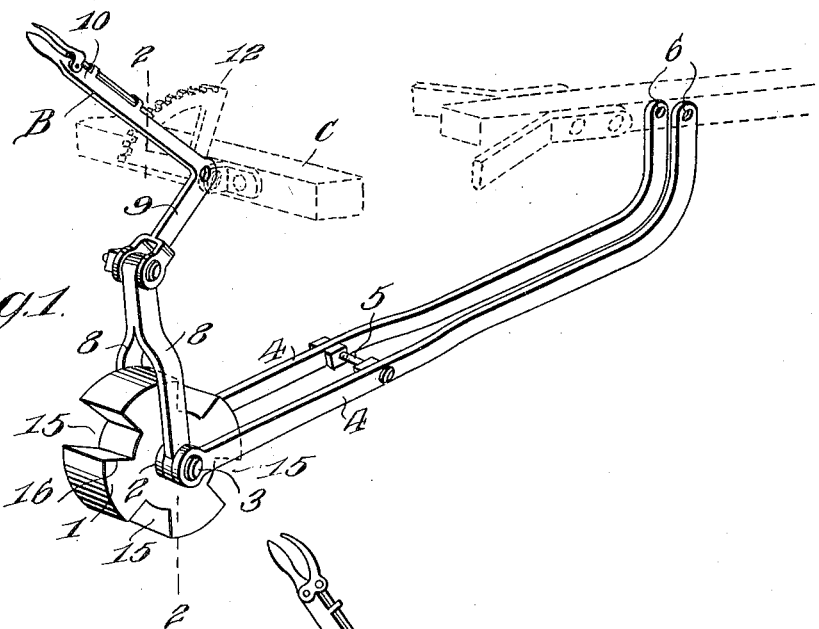
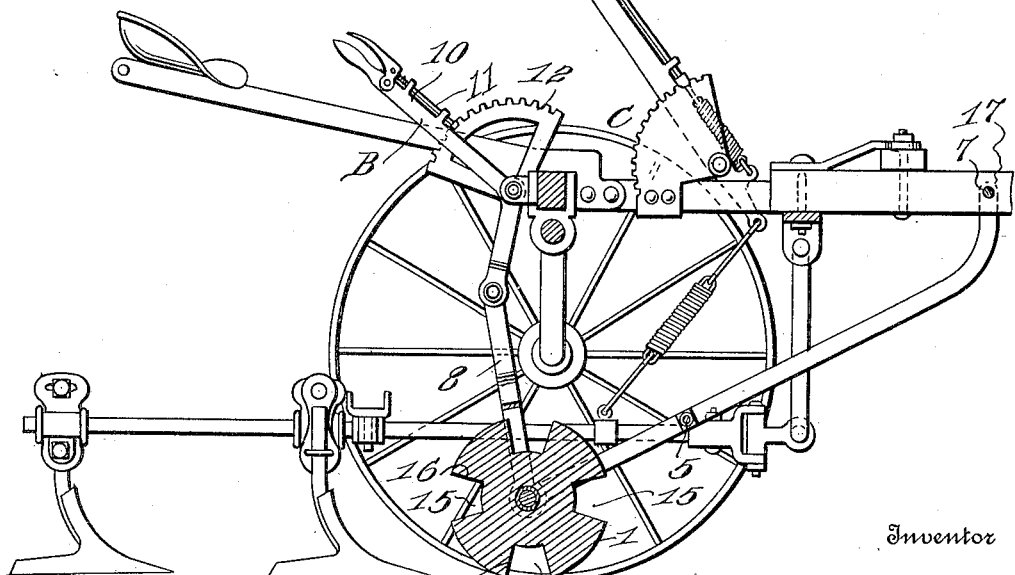

UNITED STATES PATENT OFFICE.

GEORGE W. COPELAND, OF SEATTLE, TEXAS.

COTTON-CHOPPER.

1,083,806. Specification of Letters Patent. Patented Jan. 6, 1914.

Application filed June 23, 1911. Serial No. 634,873.

*To all whom it may concern:*

Be it known that I, GEORGE W. COPELAND, a citizen of the United States, residing at Seattle, in the county of Coryell and State of Texas, have invented new and useful Improvements in Cotton-Choppers, of which the following is a specification.

This invention relates to that class of devices which are known as cotton choppers and which are used for the purpose of thinning out rows of growing plants by destroying the superfluous plants and leaving stands at proper intervals.

The main object of the present invention is to produce a device of simple and inexpensive construction which may be readily applied to and used in connection with an ordinary cultivator for the purpose of thinning out the plants by crushing the superfluous plants into the ground where they will be covered by the dirt thrown in the direction of the row by the action of the cultivator blades, the dirt serving to hill-up the stands and to cover the crushed-down plants which will thus be effectually destroyed.

A further object of the invention is to produce a crushing disk or wheel of simple and improved construction which when properly applied to a cultivator and used in connection therewith will serve to effectually crush and exterminate the plants which are to be dispensed with.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a perspective view of the improved thinning attachment for cultivators showing the same detached. Fig. 2 is a vertical sectional view.

Corresponding parts in the several figures are denoted by like characters of reference.

The improved thinning device consists essentially of a wheel or disk 1 of suitable dimensions, the same being formed from a solid block of wood which may, however, be made up of a plurality of pieces which are cemented, bolted or otherwise suitably secured together in such a manner as to insure the necessary strength. The wheel or disk 1, which is preferably made of hard wood and of such size as to insure the necessary weight and dimensions is provided with an axial aperture 2 for the passage of a shaft or axle 3 which is firmly secured in said aperture and the ends of which are journaled in the side bars 4, 4, said side bars being adjustably connected together by a rung 5. The side bars 4 which constitute the draft frame are provided adjacent to their front ends with apertures 6 for the passage of a bolt 7, whereby they may be secured upon the tongue of a cultivator. The rung 5 will allow for the lateral adjustment of the side bars 4, 4, to receive tongues of various widths or other suitable parts of connection on a cultivator.

A lifting frame is provided comprising side members 8, 8, the lower ends of which are journaled upon the shaft or axle 3. The side members 8, 8 converge upwardly and are pivotally connected with one arm 9 of the bell crank lever B which is journaled upon the frame of the cultivator C with which the device is operatively connected. The other arm 10 of the bell crank is provided with a stop member 11 adapted to engage a segment rack 12 for the purpose of retaining the bell crank and the parts associated therewith at any desired adjustment.

The wheel or disk 1 is provided at suitable intervals with notches or recesses 15 having inwardly convergent side walls 16 which may be approximately radial to the axis of the shaft 3. The recesses 15 are to be of suitable dimensions to accommodate the plants which are to be left standing, while the superfluous plants are crushed into the ground by the peripheral portion of the wheel or disk.

The operation of this invention will be readily understood from the foregoing description, taken in connection with the accompanying drawings.

The device may be readily attached to any ordinary walking or riding cultivator by connecting the side members 4 of the draft frame with the sides of the tongue, as indicated at 17, or with any other point of attachment that may be convenient and available, according to the nature and type of cultivator in connection with which the device is used. The bell crank lever and the segment stand supporting the same are now mounted upon the cultivator frame, and the device is then ready for operation.

In operation, the disk or wheel 1 is permitted to travel along the row of plants intermediate the cultivator gangs, and the superfluous plants will obviously be crushed into the ground, while stands of plants are left at suitable intervals which will be determined by the distance between the recesses 15. The pressure of the crushing disk may be conveniently gaged and regulated according to the conditions of the soil by means of the adjusting lever, the lifting frame being sufficiently stiff and rigid to force the crushing disk downward with any degree of pressure that may be exerted by the lever. This is obviously important because in the operation of the device sufficient pressure must be exerted to crush and destroy the plants which, in the absence of such pressure might be simply bent down and subsequently recover, thus rendering the operation futile. The cultivator blades will operate to throw dirt in the direction of the row, thus hilling-up the stands and covering the plants which have been crushed down, the latter being thus quickly destroyed, while the stands will be left in a condition that will permit rapid and successful growth.

The device may be quickly and easily applied to or detached from any ordinary cultivator, and it is evident from the simplicity of the device that it may be manufactured and supplied at an extremely moderate expense, avoiding the necessity of providing complicated machinery for the purpose of performing the chopping operation and which might not be conveniently available for the later cultivation of the crop. By means of the bell crank lever B it will be seen that the wheel or disk 1 may be conveniently lifted from the ground and supported at a desired elevation for transportation, or that said wheel may be lowered and maintained in a lowered position under any desired degree of pressure to enable it to operate efficiently in the manner and for the purpose set forth.

Having thus described the invention, what is claimed as new, is:—

In combination with a wheel cultivator, of a cotton thinning disk, an axle passing through the disk, a lifting frame mounted on the axle and extending above the disk, operating means on the cultivator frame and connected to the lifting frame, draft bars journaled on the axle and detachably straddling the said cultivator tongue and an adjusting rung interposed between the draft bars and adjacent to the said thinning disk, whereby said draft bars may be adjusted laterally to accommodate various sizes of tongues.

In testimony whereof I affix my signature in presence of two witnesses.

GEORGE W. COPELAND.

Witnesses:
W. H. BLAKE,
T. B. EVANS.

Copies of this patent may be obtained for five cents each, by addressing the "Commissioner of Patents, Washington, D. C."